INDIUM ARSENIDE GUNN OSCILLATOR

Filed Oct. 19, 1966

INVENTORS
JOHN W. ALLEN
MEGHA SHYAM
GERALD L. PEARSON
BY Samuel Lindenberg
Arthur Frelich
ATTORNEYS United States Patent Office 3,408,594

Patented Oct. 29, 1968

3,408,594

INDIUM ARSENIDE GUNN OSCILLATOR

John W. Allen, Palo Alto, Megha Shyam, East Palo Alto, and Gerald L. Pearson, Menlo Park, Calif., assignors to Research Corporation, New York, N.Y., a nonprofit corporation of New York Filed Oct. 19, 1966, Ser. No. 587,931
6 Claims. (Cl. 331—107)

ABSTRACT OF THE DISCLOSURE

A Gunn type oscillator is provided by applying pressure to a semi-conductor body, made of indium arsenide for example, while applying an electric potential thereacross.

This invention relates to microwave generators and, more particularly, to solid state devices for producing microwave oscillations.

It has been found that a crystal of a material such as Gallium Arsenide can be made to emit microwaves by applying a steady voltage across it. This phenomenon is known as the Gunn effect. Effectively what occurs is that as the voltage applied across a crystal of Gallium Arsenide is increased, the current flowing through the crystal increases substantially following Ohm's law, but when a threshold voltage is exceeded, the output of the crystal comprises microwave oscillations.

This phenomena is also being studied with other materials. One of the materials being investigated is indium arsenide, since pseudo-potential calculations [M. L. Cohen and T. K. Bergstresser, Phys. Rev., 141,789 (1966)] indicate that indium arsenide has a minimum at $k=0$ with a low effective mass and consequently a high mobility and low density of states. Pseudo-potential calculations indicate that the next lowest minima are in the <111> directions, with high effective mass. The energy separation, $\Delta E$, between <000> and <111> minima, is about 1 ev. The conduction band structure should therefore be suitable for the occurrence of Gunn oscillations. (See J. B. Gunn, IBM J. Res. Develop. 8, 141, 1964.) However, the Gunn oscillations have not been observed in Indium Arsenide since the energy gap, $E_G$, from valence to conduction band is only 0.35 ev. at room temperature and since $E_G$ is less than $\Delta E$, the threshold field for impact ionization is lower than that for Gunn oscillations. What is observed are only the impact ionizations.

An object of this invention is to enable indium arsenside to produce Gunn oscillations in response to the application of a DC field.

Another object of the present invention is the provision of a novel method and means for lowering the threshold field of a material for Gunn oscillations below the threshold field for impact ionization.

Still another object of the present invention is the provision of a new and useful microwave oscillator made of solid state material.

These and other objects of this invention are achieved by applying ohmic contacts to the opposite large faces of a piece of tin-doped, n-type indium arsenide. The ohmic contacts are applied to the faces which are in the (111) planes. Uniaxial pressure is applied to these opposite faces in a direction perpendicular thereto and parallel to current flow. DC current pulses are applied across these opposite faces, and Gunn oscillations occur and may be derived therefrom.

Figure 1:
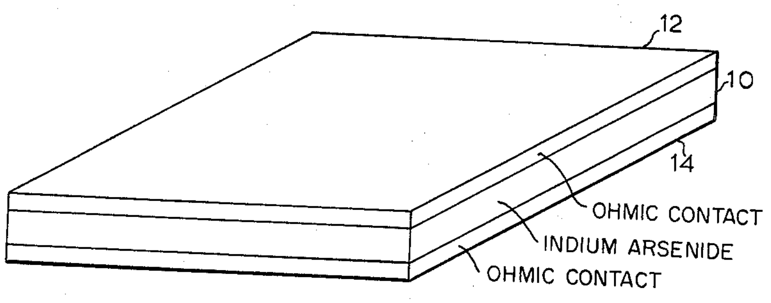
Figure 2:
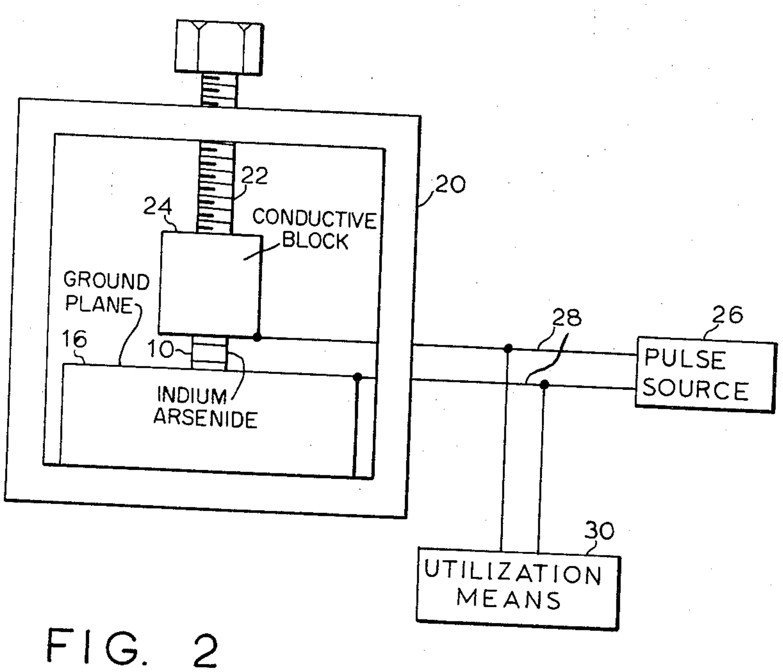

The novel features that are considered characteristic of this invention are set forth with particularity in the appended claims. The invention itself both as to its organization and method of operation as well as additional objects and advantages thereof, will best be understood from the following description when read in connection with the accompanying drawings, in which:

FIGURE 1 is an enlarged representation of an indium arsenide block which may be used in accordance with this invention as a Gunn oscillator, and FIGURE 2 is a schematic representation of one manner of utilizing indium arsenide in a pressure applying fixture for producing Gunn oscillations in accordance with this invention.

In accordance with this invention, it has been found that uniaxial pressure can cause the 000 minima to increase in energy with respect to the valence band, while the <111> minima will be almost unchanged. As a result, $E_G$ increases while $\Delta E$ decreases, whereby, above a certain critical pressure which renders $E_G$ greater than $\Delta E$, Gunn oscillations are observable at a lower field than impact ionization.

FIGURE 1 shows a block of indium arsenide 10 which has ohmic contacts respectively 12, 14, applied to the large faces by evaporating indium. These faces are the (111) planes. By way of example, and not by way of a limitation of the invention, a block such as shown in FIGURE 1, was cut from tin-doped n-type material having dimensions 0.38 mm. x 0.38 mm. and 150$\mu$ thick. The measured resistivity of these blocks was $10^{-2}$ ohm-cm. and the carrier density, $2.5 \times 10^{16}$ cm.$^{-3}$, corresponding to a mobility of 25,000 cm.$^2$/volt-sec.

Referring now to FIGURE 2, the indium arsenide block 10 was placed within a fixture of the type shown in FIGURE 2 whereby a desired pressure could be applied thereto. The block 10 was placed on a ground plane block 16. This assembly was placed within the fixture consisting of an open box-like structure 20 having a threaded opening therethrough through which a screw 22 was threaded. The screw applied pressure against another conductive block 24, which in turn applied pressure upon the indium arsenide block.

A DC pulse source 26 was connected by line 28 to the conductive blocks 16, 24, whereby DC pulses were applied across the indium arsenide block. Output from across the indium arsenide block is applied to a utilization device 30. Since the applied pulses were DC pulses and the output from the indium arsenide block consisted of oscillations, separation of the oscillations from the pulses is readily achieved by means well known in the art, such as a filter.

In accordance with this invention, it was found that when the pressure applied by the fixture exceeded a predetermined value Gunn oscillations would take place. By way of example, and not to be used as a restriction on the invention, with an indium arsenide block of the type described, upon the application of a pressure between 13 and 14 kilobars, pulses 12 nanoseconds wide were applied from the pulse source 26 at a repetition rate of 70 p.p.s., so that heating effects were small. At 14 kilobars, the threshold field for oscillation for four samples lay between 1.55 and 1.7 kilovolts per centimeter. This threshold field is the lowest that has been observed for the Gunn effect in any material, which is undoubtedly due to the high electron mobility in indium arsenide. At higher pressures, the threshold field decreases, but because of the fragility of the specimens, it is not possible to follow this effect very far. At fields lower than 13 kilobars, there is a region within which impact ionization occurs and below this, the current substantially follows Ohm's law.

The oscillations that occur when pressure and an electric field are applied to an indium arsenide crystal are coherent from pulse to pulse and, for the dimensions provided are at a frequency of 1.23±0.03 gc./s.

Succinctly stated, what occurs is believed to be that the effect of the pressure is to increase the energy required of an applied electric field to produce impact ionization and decrease the energy required to raise electrons in the indium arsenide to their higher energy level or <111> state.

There has been described and shown herein a novel, useful and unique arrangement for altering the energy requirements in a semi-conductor material so that upon the application of an electric field, Gunn oscillations are caused to occur.

What is claimed is:

1. A Gunn oscillator comprising a semiconductor body, said semiconductor body having the property that upon the application of an electrical field thereto, the threshold field required to produce impact ionization is lower than that required to produce Gunn oscillations, means for applying pressure to said semiconductor body to reduce the threshold field for Gunn oscillations below the threshold field for impact ionization.

2. A Gunn oscillator as recited in claim 1 wherein said semiconductor material comprises indium arsenide.

3. A Gunn oscillator comprising a semiconductor body made of indium arsenide, means for applying an electric potential across said indium arsenide, and means for applying pressure to said indium arsenide to enable Gunn oscillations to occur in the presence of said potential.

4. The Gunn oscillator as recited in claim 3 wherein said means for applying pressure to said indium arsenide applies a pressure which exceeds 13 kilobars.

5. A Gunn oscillator as recited in claim 4 wherein said means for applying an electric potential across said indium arsenide body includes a layer of indium on opposite faces of said indium arsenide body.

6. A Gunn oscillator as recited in claim 3 wherein said means for applying pressure applies said pressure to opposite faces of said indium arsenide which are in the (111) planes, and said means for applying a potential applies the potential to these planes.

References Cited

A. R. Hutson et al.: "Mechanism of the Gunn Effect From a Pressure Experiment," Physical Review Letters, vol. 14, Apr. 19, 1965, pp. 639–641.

H. Kroemer: "Theory of the Gunn Effect," Proceedings of the IRE, December 1964, p. 1736.

B. K. Ridley et al.: "The Possibility of Negative Resistance Effects in Semiconductors," Proceedings of the Physical Society (London), vol. 78, August 1961, pp. 301–303.

R. Dobriner: "Pace of Gunn-Effect Research Quickens," Electronic Design, Jan. 18, 1966, pp. 17, 18.

J. B. Gunn: "Microwave Oscillations of Current in III–V Semiconductors," Solid State Communications, vol. 1, pp. 88–91, 1963.

C. Hilsum: "Transferred Electron Amplifiers and Oscillators," Proceedings of the IRE, February 1962, pp. 185–189.

ROY LAKE, *Primary Examiner.*

SIEGFRIED H. GRIMM, *Assistant Examiner.*